(12) United States Patent
Ramos et al.

(10) Patent No.: US 10,094,298 B2
(45) Date of Patent: Oct. 9, 2018

(54) ECOLOGY SYSTEM EJECTOR PUMP SHUTOFF VALVE

(71) Applicant: Hamilton Sundstrand Corporation, Charlotte, NC (US)

(72) Inventors: Erick Ramos, Manchester, CT (US); Kevin Gibbons, Torrington, CT (US); Lubomir A. Ribarov, West Hartford, CT (US); Leo J. Veilleux, Jr., Wethersfiled, CT (US); James S. Elder, South Windsor, CT (US); Richard J. Carpenter, Gales Ferry, CT (US); Sushant S. Bhadange, Vermon, CT (US)

(73) Assignee: Hamilton Sunstrand Corporation, Charlotte, NC (US)

( * ) Notice: Subject to any disclaimer, the term of this patent is extended or adjusted under 35 U.S.C. 154(b) by 253 days.

(21) Appl. No.: 14/969,743

(22) Filed: Dec. 15, 2015

(65) Prior Publication Data

US 2017/0167392 A1  Jun. 15, 2017

(51) Int. Cl.
| | |
|---|---|
| B64D 37/02 | (2006.01) |
| F02C 9/36 | (2006.01) |
| B64C 3/34 | (2006.01) |
| F02C 3/04 | (2006.01) |
| F02C 7/232 | (2006.01) |
| F02C 7/236 | (2006.01) |

(Continued)

(52) U.S. Cl.
CPC .............. *F02C 9/36* (2013.01); *B64C 3/34* (2013.01); *B64D 27/12* (2013.01); *B64D 37/04* (2013.01); *F02C 3/04* (2013.01); *F02C 7/232* (2013.01); *F02C 7/236* (2013.01)

(58) Field of Classification Search
CPC .. F02C 7/22; F02C 7/222; F02C 7/232; F02C 7/236; F02C 9/36; B64D 37/04
See application file for complete search history.

(56) References Cited

U.S. PATENT DOCUMENTS

| | | | | |
|---|---|---|---|---|
| 3,810,714 A | * | 5/1974 | Turner | F02C 7/22 |
| | | | | 417/182.5 |
| 3,841,089 A | | 10/1974 | Clark | |
| 3,901,025 A | | 8/1975 | Bryerton et al. | |

(Continued)

FOREIGN PATENT DOCUMENTS

| | | |
|---|---|---|
| EP | 2977846 A1 | 1/2016 |
| GB | 1402625 | 8/1975 |

(Continued)

OTHER PUBLICATIONS

UTC U.S. Appl. No. 14/340,275, entitled "Ecology Fuel Return Systems", by Carpenter R.J., filed Jul. 24, 2014.

(Continued)

*Primary Examiner* — Richard G Davis
(74) *Attorney, Agent, or Firm* — Kinney & Lange, P.A.

(57) ABSTRACT

An ecology system includes an ecology tank, a check valve, a shutoff valve, and an ejector pump. The check valve is fluidly connected to the ecology tank and is configured to allow flow from the ecology tank. The shutoff valve is fluidly connected to the check valve, and the ejector pump is fluidly connected to the shutoff valve. The ejector pump is configured to draw fuel from the ecology tank when the shutoff valve is in an open configuration.

13 Claims, 3 Drawing Sheets

(51) Int. Cl.
    *B64D 37/04*     (2006.01)
    *B64D 27/12*     (2006.01)

(56) References Cited

U.S. PATENT DOCUMENTS

| | | | |
|---|---|---|---|
| 4,719,749 | A | 1/1988 | Greune et al. |
| 6,484,510 | B2 | 11/2002 | Futa, Jr. et al. |
| 6,619,025 | B2 | 9/2003 | Wernberg |
| 7,726,112 | B2 | 6/2010 | Dooley |
| 8,083,204 | B2 | 12/2011 | Maker |
| 8,122,699 | B2 | 2/2012 | Lawrence et al. |
| 8,234,875 | B2 | 8/2012 | Falke et al. |
| 8,353,306 | B2 | 1/2013 | Futa et al. |
| 8,567,201 | B2 | 10/2013 | Dalton |
| 2004/0154302 | A1 | 8/2004 | Wernberg et al. |
| 2008/0115481 | A1* | 5/2008 | Maker ............... F01D 25/32 60/39.094 |
| 2008/0271456 | A1* | 11/2008 | Scully ............... F02C 7/228 60/740 |
| 2012/0271527 | A1 | 10/2012 | Zebrowski et al. |
| 2013/0000318 | A1* | 1/2013 | Dalton ............... F02C 7/222 60/779 |

FOREIGN PATENT DOCUMENTS

| | | |
|---|---|---|
| GB | 1402996 | 8/1975 |
| GB | 2227795 | 8/1990 |
| RU | 2033547 C1 | 4/1995 |

OTHER PUBLICATIONS

Extended British Search Report, for British Patent Application No. 1621161.7, dated Jun. 12, 2017, 6 pages.

\* cited by examiner

ECOLOGY SYSTEM EJECTOR PUMP SHUTOFF VALVE

BACKGROUND

The present invention relates generally to fuel systems, and more particularly to an ecology system of a gas turbine engine.

A gas turbine engine typically uses a compressor section to deliver compressed air to a combustor section. The combustor section includes a plurality of combustors with each combustor including one or more fuel nozzles. In the combustor section, the fuel is mixed with the air and ignited (by igniters) thus resulting in combustion of the fuel-air mixture. This high-energy combustion exhaust gas is expanded through the turbine section to power the compressor section (which are connected via a common shaft) and exits the engine to produce thrust. In addition, a gas turbine engine can include a fan that is powered by the turbine section that can produce even more thrust.

After an aircraft has completed a flight, the gas turbine engine can be shut down by ceasing delivery of fuel to the combustor section. But unburned fuel can remain in the fuel nozzles and in the fuel lines leading thereto. This unburned fuel can evaporate into the atmosphere or flow out onto the tarmac, which is detrimental from both an economic and ecological standpoint. In addition, while the engine is still hot, the fuel remaining in the fuel nozzles can decompose thermally, thus leaving coke and/or varnish on the fuel nozzles, which impacts their function. Therefore, ecology systems have been developed to reclaim this unburned fuel.

SUMMARY

According to one embodiment of the present invention, an ecology system includes an ecology tank, a check valve, a shutoff valve, and an ejector pump. The check valve is fluidly connected to the ecology tank and is configured to allow flow from the ecology tank. The shutoff valve is fluidly connected to the check valve, and the ejector pump is fluidly connected to the shutoff valve. The ejector pump is configured to draw fuel from the ecology tank when the shutoff valve is in an open configuration.

DETAILED DESCRIPTION

Figure 1:
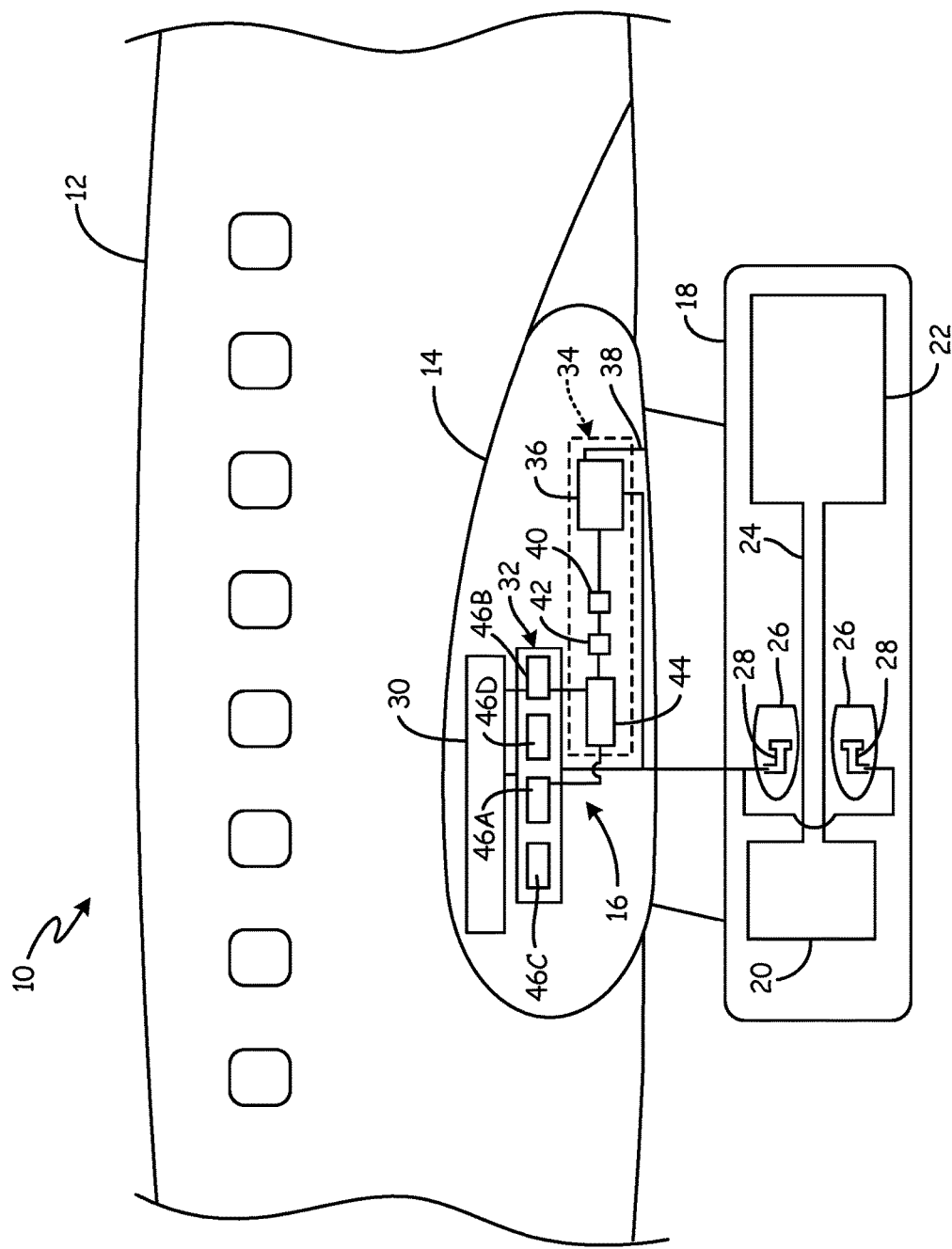
FIG. 1 is a cut-away view of a portion of an aircraft including a schematic of a fuel system.

FIG. 1 is a cut-away view of a portion of aircraft 10 including fuselage 12, wing 14, a schematic representation of fuel system 16, and gas turbine engine 18. Wing 14 is attached to fuselage 12, and gas turbine engine 18 is attached to wing 14. Gas turbine engine 18 includes compressor 20 connected to turbine 22 by shaft 24. Between compressor 20 and turbine 22 is a plurality of combustors 26 each having at least one fuel nozzle 28. Fuel nozzles 28 are the final destination for fuel from fuel system 16 because the fuel is burned in combustors 26 in order to convert the chemical energy contained therein into thermal, pressure, and kinetic energy that is used to produce thrust.

In the illustrated embodiment, fuel system 16 is located at least in part in wing 14, and fuel system 16 includes main fuel tank 30, pumping system 32, and ecology system 34. Main fuel tank 30 is a fuel source that is attached to wing 14, and pumping system 32 is fluidly connected to main fuel tank 30 and fuel nozzles 28. Ecology system 34 is located beneath at least a portion of main fuel tank 30 and is fluidly connected to pumping system 32 and fuel nozzles 28. Ecology system 34 includes ecology tank 36, vent 38, check valve 40, shutoff valve 42, and ejector pump 44. Ecology tank 36 is fluidly connected to fuel nozzles 28 and includes vent 38 which leads overboard. Check valve 40 is fluidly connected to ecology tank 36 separate from vent 38, and shutoff valve 42 is fluidly connected to check valve 40. Ejector pump 44 is fluidly connected to shutoff valve 42 and to pumping system 32. Pumping system 32 includes fuel pumps 46A-46D, and ejector pump 44 is fluidly connected to fuel pump 46A at an upstream end and to fuel pump 46B at a downstream end. Ejector pump 44 is connected to both fuel pumps 46A and 46B because ejector pump 44 is an aspirator pump that can draw fuel from ecology tank 36 (through check valve 40 and shutoff valve 42) when fuel is flowed from fuel pump 46A to fuel pump 46B.

During operation of gas turbine engine 18, fuel is pumped by pumping system 32 from main fuel tank 30 to fuel nozzles 28. This is accomplished by utilizing at least one of fuel pumps 46A-46D. During shutdown of gas turbine engine 18, fuel is no longer pumped to fuel nozzles 28, and compressor 20, turbine 22, and shaft 24 begin to decrease the rate at which they rotate. Concordantly, pumping system 32 also winds down, which begins to decrease the output of fuel pumps 46A and 46B. During this time shutoff valve 42 is closed, and the pressure in the fuel lines (due to the residual pressure from the fuel pumps 46A-46D and the head pressure from main fuel tank 30) forces the fuel into ecology tank 36. In the illustrated embodiment, ecology tank 36 is not configured to be a pressure vessel, so ecology tank 36 includes vent 38. While ecology tank 36 is voluminous enough to contain the reclaimed fuel from the fuel lines, if a substantial amount of additional fuel were pumped into ecology tank 36 then fuel would be forced out of ecology tank 36 through vent 38 and out of wing 14 altogether.

During startup of gas turbine engine 18, pumping system 32 begins to operate, which may begin to increase the output of fuel pumps 46A and 46B. In the illustrated embodiment, at least a portion of the output of fuel pumps 46A and 46B is used to power ejector pump 44. As fuel flows from fuel pump 46A to fuel pump 46B, that fuel that was collected during shutdown of gas turbine engine 18 is drawn out of ecology tank 36 through check valve 40 and shutoff valve 42 (which is open during this process). This fuel is returned to main fuel tank 30 by ejector pump 44 and fuel pump 46B. Once ecology tank 36 is drained of the reclaimed fuel, a valve (not shown) inside of ecology tank 36 can be closed based on the fuel level of ecology tank 36 and/or shutoff valve 42 can be closed. This prevents suction from being continually applied to an empty ecology tank 36, thus preventing air from being introduced and dissolved into the fuel through ejector pump 44, which is undesirable.

The components and configuration of aircraft 10 allow for the operation of ecology system 34 to reclaim fuel that may otherwise be wasted. Shutoff valve 42 can be opened or closed during the different stages of operation of gas turbine engine 18. In general, in order to stop fuel from overflowing ecology tank 36 through vent 38, shutoff valve 42 can be closed during potential reverse-flow conditions, and, in turn, shutoff valve 42 can be opened when it is beneficial to drain fuel from ecology tank 36.

More specifically, the operation of shutoff valve 42 can be particularly important during the shutdown, rest, and start of gas turbine engine 18. During the shutdown and start processes, there may be a purposeful or an incidental imbalance of the pressures of the outputs of fuel pumps 46A and 46B that would tend to cause reverse flow of fuel through ejector pump 44. Furthermore, during the resting period (i.e. shutoff or non-operation) of gas turbine engine 18, pressure in the fuel lines may tend to cause reverse fuel flow. Any of these reverse flows could be powerful enough to force fuel through check valve 40 and into ecology tank 36. To the contrary, at some point during the start process, there will be an opportunity to drain ecology tank 36, and shutoff valve 42 should be opened for at least that time period.

Depicted in FIG. 1 is one embodiment of the present invention, to which there are alternative embodiments. For example, pumping system 32 can have greater or fewer fuel pumps 46 than four. For another example, ejector pump 44 can be another type of pump. In such a situation, ejector pump 44 may not be fluidly connected to both fuel pumps 46A and 46B. For a further example, fuel pumps 46A-46D can be driven by electric motors that are powered by generators (not shown) that are driven by gas turbine engine 18. For a further example, gas turbine engine 18 may be located near the tail of aircraft 10 (not shown). In such a configuration, main fuel tank 30 may be positioned lower than ecology system 34.

Figure 2A:
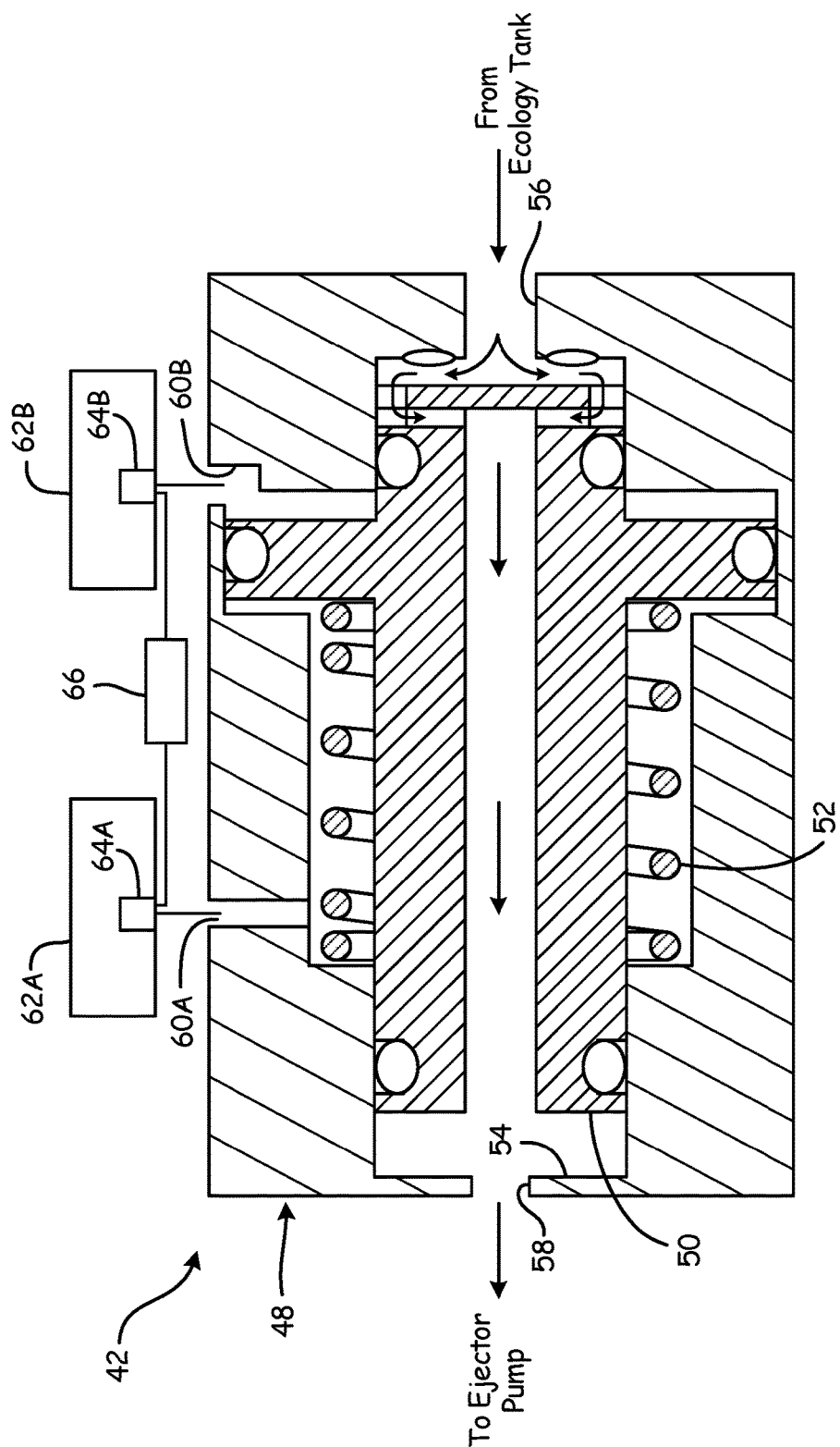
FIG. 2A is a cross-section of an ecology system shutoff valve in an open configuration.
Figure 2B:
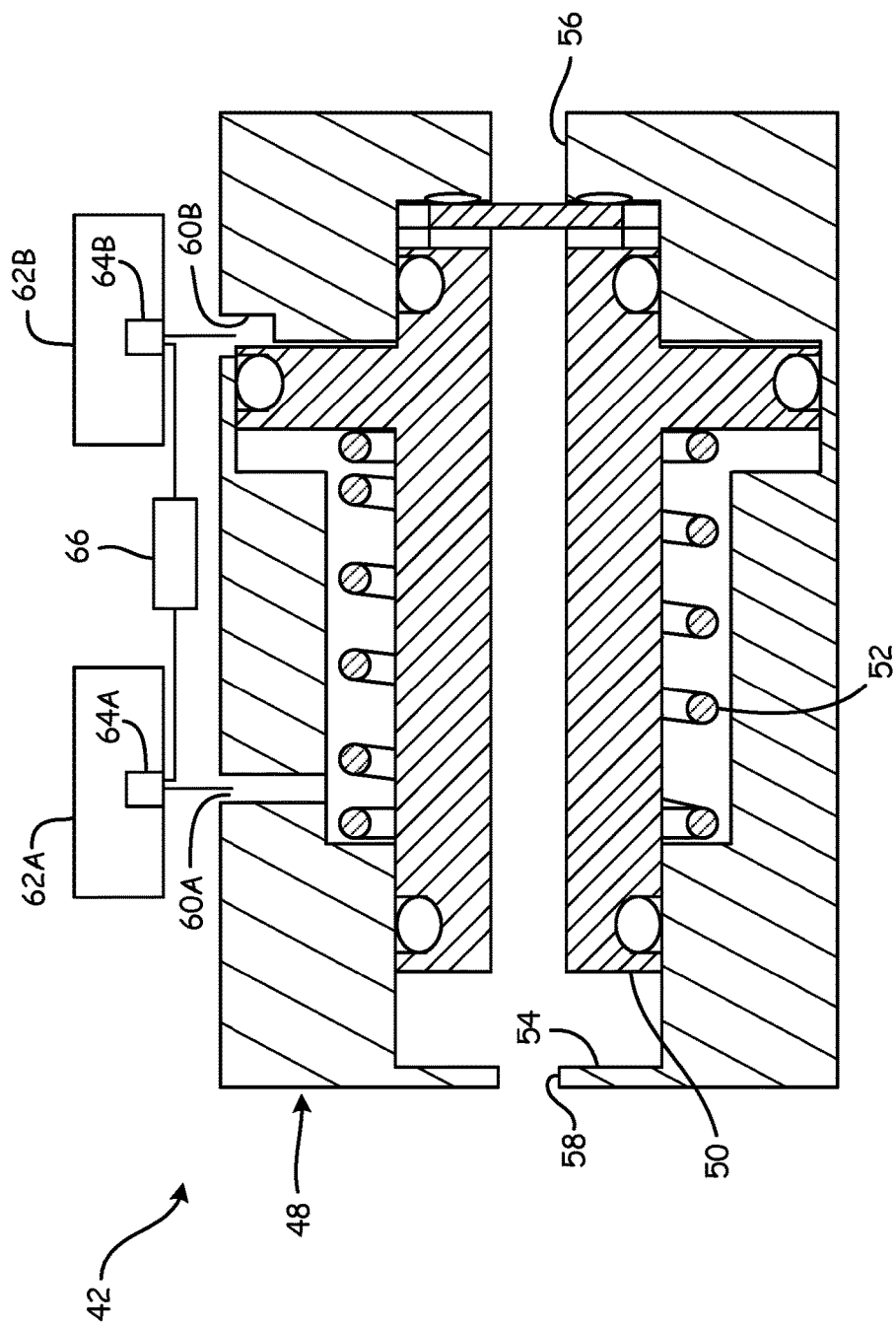
FIG. 2B is a cross-section of an ecology system shutoff valve in a closed configuration.

FIG. 2A is a cross-section of shutoff valve 42 in an open configuration. FIG. 2B is a cross-section of shutoff valve 42 in a closed configuration. These figures will now be discussed together.

In the illustrated embodiment, shutoff valve 42 is a two-way spool valve. Shutoff valve 42 includes body 48, spool 50, and spring 52. Body 48 includes cavity 54 that is fluidly connected to inlet 56 at an upstream end of body 48 and to outlet 58 at a downstream end. Cavity 54 is also fluidly connected to pilots 60A and 60B. Spool 50 is located in cavity 54 and includes a plurality of dynamic seals that interact with spool 50 and body 48. Spool 50 is slidable between an open configuration (shown in FIG. 2A) and a closed configuration (shown in FIG. 2B). Spring 52 is also located in cavity 54 and is in contact with body 48 and spool 50. Spring 52 biases spool 50 into the closed configuration.

In addition to spring 52, fluid pressure can be applied through pilots 60A and 60B to move spool 50 between the open configuration and the closed configuration. Pilot 60A is fluidly connected to pressure source 62A, and pilot 60B is fluidly connected to pressure source 62B. Pressure sources 62A and 62B can be pressure vessels that include pressurized fluid, such as fuel, oil, or air. Alternatively, pressure sources 62A and 62B can be any two of fuel pumps 46A-46D (shown in FIG. 1). Pressure sources 62A and 62B can include solenoid valves 64A and 64B, respectively, to selectively control the pressurization of pilots 60A and 60B, respectively. In such an embodiment, solenoid valves 64A and 64B are electrically connected to controller 66, which controls the actuation of solenoid valves 64A and 64B using electrical signals.

When pilot 60B is sufficiently pressurized to overcome the force from spring 52 and the pressure that may be present in pilot 60A, spool 50 will move to allow fuel to flow from inlet 56 to outlet 58 (as denoted by the series of arrows in FIG. 2A). This would allow fuel to flow from ecology tank 36 through ejector pump 44 to main fuel tank 30 (shown in FIG. 1). When the pressure in pilot 60B is decreased and/or the pressure in pilot 60A is increased, spool 50 will move to seal against body 48, preventing fuel from entering cavity 54. This configuration prevents flow between ecology tank 36 and ejector pump 44 (both shown in FIG. 1) in both directions.

The scheduling of shutoff valve 42 can occur according to an active schedule or a passive schedule. Depending on the scheduling regime used, the configuration of and the components in fuel system 16 (shown in FIG. 1) may differ. In an active schedule, solenoid valves 64A and 64B control the pressure in pilots 60A and 60B, respectively, according to the stages of operation of gas turbine engine 18 (shown in FIG. 1). This regime can be used to prevent substantially all reverse flow from ejector pump 44 to ecology tank 36 (shown in FIG. 1), which may eliminate the need for check valve 40.

In a passive schedule, pilots 60A and 60B are each directly fluidly connected to one of fuel pumps 46A-46D (without utilizing solenoid valves 64A and 64B or controller 66). Which of fuel pumps 46A-46D is fluidly connected to which of pilots 60A-60B depends on the relative pressures that fuel pumps 46A-46D are outputting at different times during the operation of gas turbine engine 18 (shown in FIG. 1). This determination may be complicated by the fact that the output of fuel pumps 46A-46D will be dynamically increasing and decreasing during startup and shutdown, respectively. On the other hand, this determination may be simplified by the facts that ecology tank 36 (shown in FIG. 1) may have its own valve (not shown) to prevent air from flowing from an empty ecology tank 36 to ejector pump 44 (shown in FIG. 1) during steady-state flight operation, and that spring 52 biases shutoff valve 42 in the closed configuration when gas turbine engine is not operating. In general though, pilots 60A and 60B would be fluidly connected to whichever of fuel pumps 46A-46D that would prevent the most reverse flow from ejector pump 44 to ecology tank 36.

The components and configuration of shutoff valve 42 as shown in FIGS. 2A and 2B allow for shutoff valve 42 to be scheduled to be open or closed depending on whether there is a reverse flow condition that would encourage fuel to flow from ejector pump 44 into ecology tank 36 (shown in FIG. 1) or depending on whether ecology tank 36 needed to be drained. Shutoff valve 42 can also be closed with a substantial amount of force depending on the weight of spring 52 and the pressures in pilots 60A and 60B. This ability can be beneficial to preventing higher pressure backflow than a more lightly closed valve (for example, check valve 40) could withstand.

It should be recognized that the present invention provides numerous benefits and advantages. For example, ecology system 34 is allowed to reclaim fuel after shutdown of gas turbine engine 18. The risk of overfilling ecology tank 36 is mitigated due to the implementation of shutoff valve 42, which is controlled to open and close at various times to allow ecology system 34 to function beneficially.

DISCUSSION OF POSSIBLE EMBODIMENTS

The following are non-exclusive descriptions of possible embodiments of the present invention.

An ecology system according to an exemplary embodiment of this disclosure, among other possible things includes: an ecology tank; a check valve fluidly connected to the ecology tank, the check valve configured to allow flow from the ecology tank; a shutoff valve fluidly connected to the check valve; and an ejector pump fluidly connected to the shutoff valve, the ejector pump configured to draw fuel from the ecology tank when the shutoff valve is in an open configuration.

The ecology system of the preceding paragraph can optionally include, additionally and/or alternatively, any one or more of the following features, configurations and/or additional components:

A further embodiment of the foregoing ecology system, wherein the shutoff valve can further comprise: a body with a cavity; a spool located in the cavity, the spool being movable between an open configuration and a closed configuration; a spring located in the cavity that is in contact with the body, wherein the spool that biases the spool into the closed configuration; a first pilot in the body that biases the spool into the closed configuration when pressurized; and a second pilot in the body that biases the spool in the open configuration when pressurized.

A further embodiment of any of the foregoing fuel systems, wherein the first pilot can be connected to a first solenoid valve and the second pilot can be connected to a second solenoid valve, and wherein the first and second solenoid valves can be electrically connected to a controller that can be configured to send electrical signals to the first and second solenoid valves in order to selectively pressurize the first pilot and the second pilot to control the shutoff valve A further embodiment of any of the foregoing fuel systems, wherein the first pilot can be fluidly connected to a first pump and the second pilot can be fluidly connected to a second pump to selectively pressurize the first pilot and the second pilot to control the shutoff valve.

A further embodiment of any of the foregoing fuel systems, wherein the shutoff valve can be configured to be in a closed configuration during potential reverse-flow conditions when fuel is pressurized to flow from the ejector pump to the ecology tank.

A fuel system according to an exemplary embodiment of this disclosure, among other possible things includes: a main fuel tank; a pumping system fluidly connected to the main fuel tank, the pumping system including a first pump and a second pump; a fuel destination fluidly connected to the pumping system; and an ecology system fluidly connected to the fuel destination and the pumping system, the ecology system comprising: an ecology tank fluidly connected to the fuel destination; a shutoff valve fluidly connected to the ecology tank; and an ejector pump fluidly connected to the shutoff valve and the pumping system.

The fuel system of the preceding paragraph can optionally include, additionally and/or alternatively, any one or more of the following features, configurations and/or additional components:

A further embodiment of the foregoing fuel system, wherein the ejector pump can be fluidly connected to the first pump and the second pump.

A further embodiment of any of the foregoing fuel systems, wherein the ejector pump can be an aspirator pump that is fluidly connected to the first pump at an upstream end and to the second pump at a downstream end.

A further embodiment of any of the foregoing fuel systems, wherein the fuel system can further comprise: a check valve fluidly connected to the ecology tank and the shutoff valve, the check valve configured to allow fuel to flow from the ecology tank to the ejector pump.

A further embodiment of any of the foregoing fuel systems, wherein the shutoff valve can be fluidly connected to a first pilot for controlling the shutoff valve.

A further embodiment of any of the foregoing fuel systems, wherein the shutoff valve can be fluidly connected to a second pilot for controlling the shutoff valve in conjunction with the first pilot.

A further embodiment of any of the foregoing fuel systems, wherein the first pilot can be connected to a first solenoid valve and the second pilot can be connected to a second solenoid valve and the first and second solenoid valves can be electrically connected to a controller.

A further embodiment of any of the foregoing fuel systems, wherein the first and second pilots can be fluidly connected to the pumping system and control the shutoff valve with fuel pressure.

A further embodiment of any of the foregoing fuel systems, wherein the first pilot can be directly fluidly connected to the first pump, and the second pilot can be directly fluidly connected to the second pump.

A further embodiment of any of the foregoing fuel systems, wherein the ecology tank can include a vent to overboard.

A further embodiment of any of the foregoing fuel systems, wherein the shutoff valve can comprise: a body with a cavity; a spool located in the cavity, the spool being movable between an open configuration and a closed configuration; and a spring located in the cavity that is in contact with the body, wherein the spool that biases the spool into the closed configuration.

An aircraft according to an exemplary embodiment of this disclosure, among other possible things includes: an airframe; a wing attached to the airframe; a gas turbine engine attached to the wing, the gas turbine engine including a combustor with a fuel nozzle; a main fuel tank attached to the wing and fluidly connected to the gas turbine engine to provide fuel to the fuel nozzle; and an ecology system fluidly connected to the fuel nozzle and the main fuel tank to remove fuel from the fuel nozzle, the ecology system comprising: an ecology tank fluidly connected to the fuel nozzle and to a vent to overboard; and a shutoff valve fluidly connected to the ecology tank and the main fuel tank, the shutoff valve preventing fuel from flowing from the main fuel tank to the vent to overboard when the shutoff valve is in a closed configuration.

The aircraft of the preceding paragraph can optionally include, additionally and/or alternatively, any one or more of the following features, configurations and/or additional components:

A further embodiment of the foregoing aircraft, wherein the aircraft can further comprise: a pumping system fluidly connected to the main fuel tank and the ecology system to pump fuel from the main fuel tank to the fuel nozzle and from the ecology tank to the main fuel tank, the pumping system including a first pump and a second pump.

A further embodiment of any of the foregoing aircrafts, wherein the aircraft can further comprise: an ejector pump fluidly connected to the shutoff valve and the pumping system to pump fuel from the ecology tank to the pumping system.

A further embodiment of any of the foregoing aircrafts, wherein the shutoff valve can be fluidly connected to a first pilot and a second pilot, and wherein the first pilot can be directly fluidly connected to the first pump, and the second pilot can be directly fluidly connected to the second pump to control the shutoff valve with fuel pressure.

A further embodiment of any of the foregoing aircrafts, wherein the ecology system can further comprise: a check valve fluidly connected to the ecology tank and the shutoff valve, the check valve configured to allow fuel to flow from the ecology tank to the ejector pump.

A further embodiment of any of the foregoing aircrafts, wherein the shutoff valve can be fluidly connected to a first pilot and a second pilot for controlling the shutoff valve.

A further embodiment of any of the foregoing aircrafts, wherein the first pilot can be connected to a first solenoid valve and the second pilot can be connected to a second solenoid valve and the first and second solenoid valves can be electrically connected to a controller for controlling the shutoff valve.

A further embodiment of any of the foregoing aircrafts, wherein the first pilot can be fluidly connected to one of the first and second pumps, and the second pilot can be fluidly connected to the other of the first and second pumps to control the shutoff valve with fuel pressure.

A further embodiment of any of the foregoing aircrafts, wherein a portion of the main fuel tank can be located higher in the wing than the ecology tank.

A further embodiment of any of the foregoing aircrafts, wherein a portion of the main fuel tank can be located lower in the wing than the ecology tank.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system comprising:
a pumping system for pumping fuel from a fuel source, the pumping system including a first pump and a second pump;
a fuel destination fluidly connected to the pumping system; and
an ecology system fluidly connected to the fuel destination and the pumping system, the ecology system comprising:
an ecology tank fluidly connected to the fuel destination;
a shutoff valve fluidly connected to the ecology tank, wherein the shutoff valve is fluidly connected to a first pilot and to a second pilot for controlling the shutoff valve; and
an ejector pump fluidly connected to the shutoff valve and the pumping system.

2. The fuel system of claim 1, wherein the ejector pump is fluidly connected to the first pump and the second pump.

3. The fuel system of claim 2, wherein the ejector pump is an aspirator pump that is fluidly connected to the first pump at an upstream end and to the second pump at a downstream end.

4. The fuel system of claim 1, further comprising:
a check valve fluidly connected to the ecology tank and the shutoff valve, the check valve configured to allow fuel to flow from the ecology tank to the ejector pump.

5. The fuel system of claim 1, wherein the first pilot is connected to a first solenoid valve and the second pilot is connected to a second solenoid valve and the first and second solenoid valves are electrically connected to a controller.

6. The fuel system of claim 1, wherein the first and second pilots are fluidly connected to the pumping system and control the shutoff valve with fuel pressure.

7. The fuel system of claim 6, wherein the first pilot is directly fluidly connected to the first pump, and the second pilot is fluidly connected to the second pump.

8. The fuel system of claim 1, wherein the shutoff valve comprises:
a body with a cavity;
a spool located in the cavity, the spool being movable between an open configuration and a closed configuration; and
a biasing arrangement located in the cavity that is in contact with the body, wherein the biasing arrangement that biases the spool into the closed configuration.

9. An aircraft comprising:
an airframe;
a wing attached to the airframe;
a gas turbine engine attached to the wing, the gas turbine engine including a combustor with a fuel nozzle;
a main fuel tank attached to the wing;
a pumping system for pumping fuel from the main fuel tank, the pumping system including a first pump and a second pump, wherein the pumping system is fluidly connected to the gas turbine engine to provide fuel to the fuel nozzle; and
an ecology system fluidly connected to the fuel nozzle and the main fuel tank to remove fuel from the fuel nozzle, the ecology system comprising:
an ecology tank fluidly connected to the fuel nozzle and to a vent to overboard;
a shutoff valve fluidly connected to the ecology tank and the main fuel tank, the shutoff valve preventing fuel from flowing from the main fuel tank to the vent to overboard when the shutoff valve is in a closed configuration, wherein the shutoff valve is fluidly connected to a first pilot and to a second pilot for controlling the shutoff valve; and
an ejector pump fluidly connected to the shutoff valve and the pumping system.

10. The aircraft of claim 9, wherein the ejector pump is fluidly connected to the shutoff valve and the pumping system to pump fuel from the ecology tank to the pumping system.

11. The aircraft of claim 9, wherein the first pilot is directly fluidly connected to the second pump to control the shutoff valve with fuel pressure.

12. The aircraft of claim 9, wherein the ecology system further comprises:
a check valve fluidly connected to the ecology tank and the shutoff valve, the check valve configured to allow fuel to flow from the ecology tank to the ejector pump.

13. The aircraft of claim 9, wherein the first pilot is connected to a first solenoid valve and the second pilot is connected to a second solenoid valve, and wherein the first and second solenoid valves are electrically connected to a controller for controlling the shutoff valve.

* * * * *